(12) United States Patent
Jungert

(10) Patent No.: US 7,055,891 B2
(45) Date of Patent: Jun. 6, 2006

(54) AIR-CONDUCTING DEVICE FOR A MOTOR VEHICLE AND METHOD OF MAKING SAME

(75) Inventor: Dieter Jungert, Weissach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 107 days.

(21) Appl. No.: 10/861,908

(22) Filed: Jun. 7, 2004

(65) Prior Publication Data

US 2005/0017541 A1 Jan. 27, 2005

(30) Foreign Application Priority Data

Jun. 6, 2003 (DE) .............................. 103 25 653

(51) Int. Cl.
*B62D 37/02* (2006.01)
(52) U.S. Cl. .............................. 296/180.5; 296/901.01
(58) Field of Classification Search ............ 296/180.1, 296/180.5, 901.01, 181.2; 180/903
See application file for complete search history.

(56) References Cited

U.S. PATENT DOCUMENTS 4,659,130 A * 4/1987 Dimora et al. ........... 296/180.1

6,953,218 B1 * 10/2005 Jungert .................... 296/180.1
2003/0116996 A1 6/2003 Soja et al.

FOREIGN PATENT DOCUMENTS

DE 101 60 748 6/2003
WO WO 02/051688 A2 7/2002

* cited by examiner

*Primary Examiner*—Stephen Gordon
(74) *Attorney, Agent, or Firm*—Crowell & Moring LLP

(57) ABSTRACT

An air-conducting device for a motor vehicle has an operating element and a spoiler lip extending completely or partly over the vehicle width, by means of which operating element the spoiler lip can be displaced from a moved-in inoperative position into a moved-out operative position, and which spoiler lip comprises an elastic and extensible material. For achieving a sufficient stiffness of the spoiler lip, it is provided that the spoiler lip is made of a fiber composite material matrix which is extensible and elastic. The fiber composite material, in addition, has a first fiber group with fibers embedded in the matrix which are essentially inextensible and extend transversely to the direction of the vehicle width and the direction of the width span of the spoiler lip. The matrix further includes a second fiber group with fibers which are elastic and extend in the direction of the vehicle width.

25 Claims, 2 Drawing Sheets

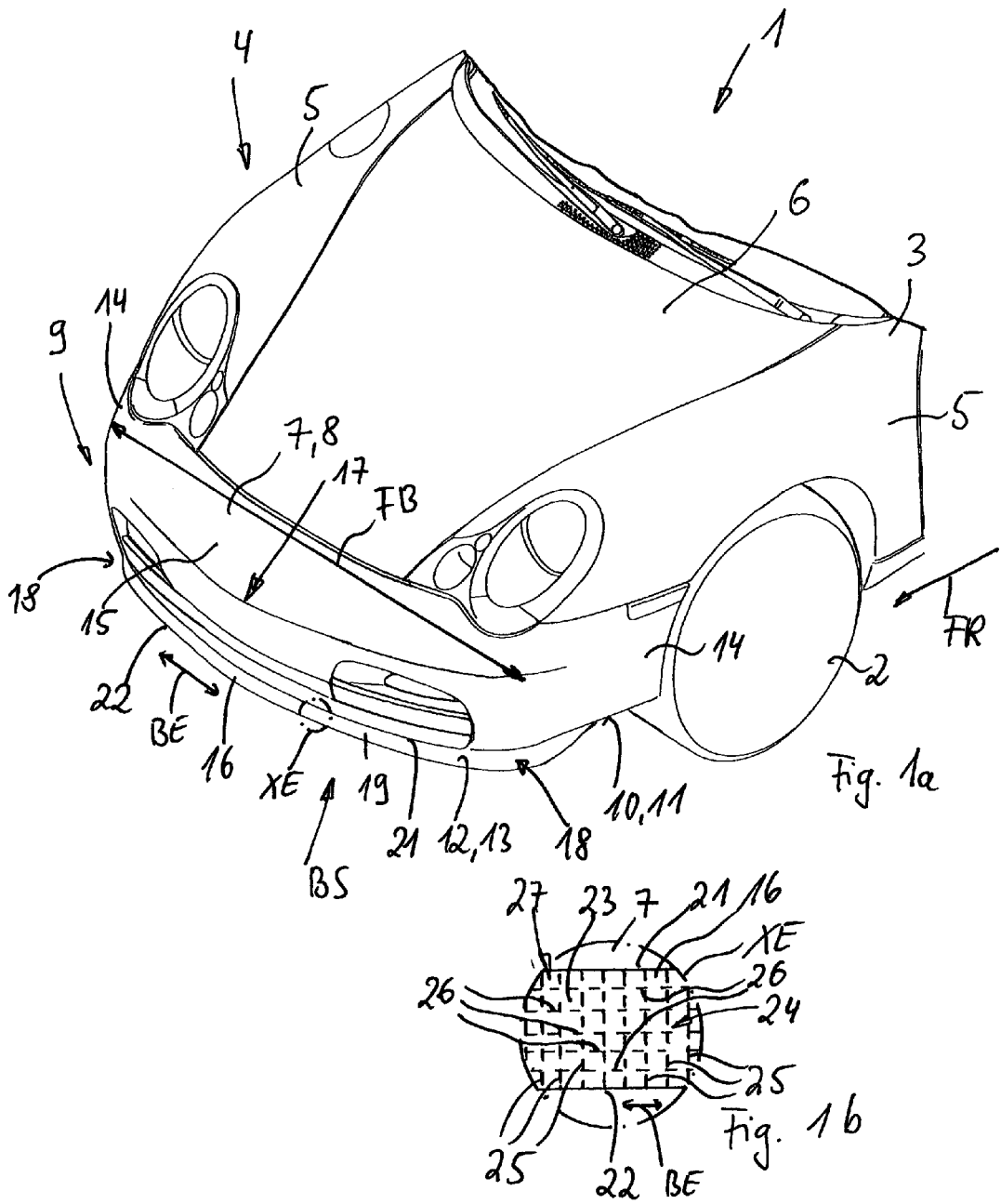

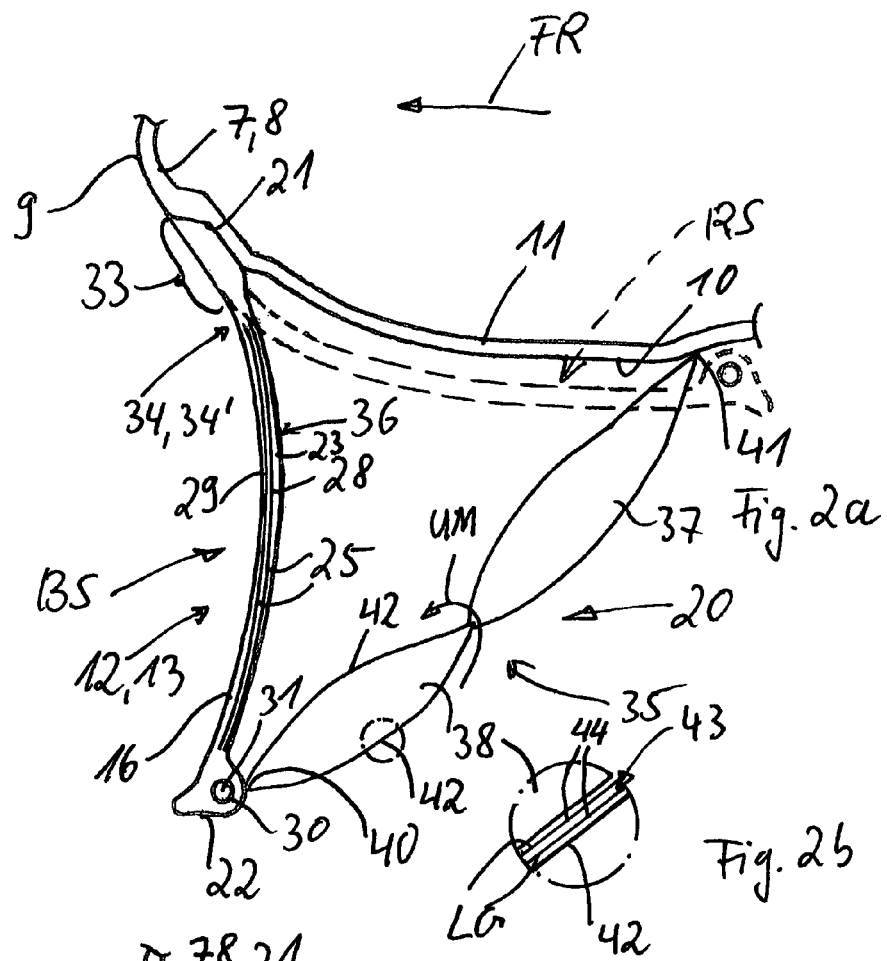
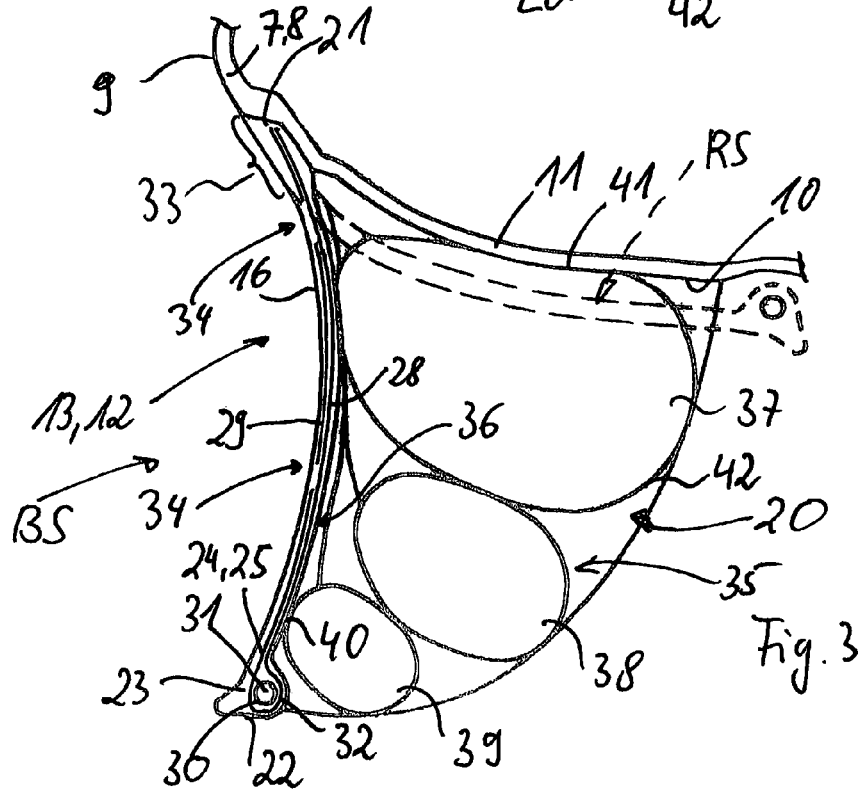

AIR-CONDUCTING DEVICE FOR A MOTOR VEHICLE AND METHOD OF MAKING SAME

BACKGROUND AND SUMMARY OF THE INVENTION

This application claims the priority of Application No.103 25 653.9 filed in Germany on Jun. 6, 2003, the disclosure of which is expressly incorporated by reference herein.

The invention is based on an air-conducting device for a motor vehicle. Preferred embodiments of the invention relate to an air-conducting device for a motor vehicle, having an operating element and a spoiler lip extending completely or partly over the vehicle width, by means of which operating element the spoiler lip can be displaced from a moved-in inoperative position into a moved-out operative position, and which spoiler lip comprises an elastic and extensible material.

From German Patent Document DE 101 60 748.2 (corresponding U.S. Published Application No. 2003/116996) which is a later publication, an air-conducting element of the above-mentioned type is described which has an operating element for a spoiler lip, which spoiler lip extends completely or partly over the vehicle width. By means of the operating element, the spoiler lip can be displaced from a moved-in inoperative position into a moved-out operative position, an elastic and extensible material been selected for the spoiler lip.

It is an object of the invention to optimize an air-conducting device of the initially mentioned type.

This object is achieved according to certain preferred embodiments of the invention by providing an air-conducting device for a motor vehicle, having an operating element and a spoiler lip extending completely or partly over the vehicle width, by means of which operating element the spoiler lip can be displaced from a moved-in inoperative position into a moved-out operative position, and which spoiler lip comprises an elastic and extensible material, wherein the spoiler lip is made of a fiber composite material with a matrix of the fiber composite material being extensible and elastic, wherein a first fiber group has fibers embedded in the matrix, which fibers extend extend transversely to a direction of the vehicle width and transversely to a direction of the width span of the spoiler lip, and wherein the fibers of the first fiber group are essentially inextensible.

Further advantageous features of preferred embodiments of the invention are described herein and in the claims.

Important advantages achieved by means of certain preferred embodiments of the invention are that, by means of the essentially inextensible fibers of the first fiber group, a spoiler lip is provided which is dimensionally stable particularly in the moved-out operative position and which, also at high driving speeds and correspondingly high air pressure forces, is hardly or insignificantly deformed, whereby the desired aerodynamic effect of the spoiler lip is maintained. As a result of the inextensible fibers with the alignment according to the invention transversely to the width span of the spoiler lip, the extensibility of the spoiler lip in the direction of the width span is maintained, which is advantageous particularly for motor vehicles with a rounded shape of the forward structure. By means of the use of the fiber composite, the spoiler lip is more resistant in the event of an influence of foreign bodies, so that, in addition, the operating element is shielded by the spoiler lip.

According to a further development of certain preferred embodiments of the invention, the matrix of the fiber composite material is reinforced by a second fiber group which has fibers extending in the direction of the width span of the spoiler lip and being elastically extensible. The stability of the spoiler lip is further improved in that the extensibility is maintained in the direction of the width span. In addition, as a result of the elastically extensible fibers of the second fiber group, higher restoring forces can be provided for the spoiler lip if, during the movement from the inoperative into the moved-out operative position, the latter is stretched into the direction of the vehicle width.

In order to further increase the dimensional stability of the spoiler lip in the moved-out operative position, in certain preferred embodiments of the invention, at least one bending-elastic element extending along the vehicle width is arranged at a free end inside the spoiler lip.

As a result of the fact that the fibers extend at least partially around the bending-elastic element in certain preferred embodiments of the invention, the spoiler lip receives a high dimensional stability also in the area of its free end.

A simplification with respect to the manufacturing of the spoiler lip is achieved by providing that the fiber roving is caused to extend around the bending-elastic element.

According to certain preferred embodiments of the invention, the fibers of the first fiber group extend to the bending-elastic element and therefore the dimensional stability of the spoiler lip is reduced in a defined area, specifically the desired bending area, whereby the spoiler lip can be displaced in a hinge-type manner out of the inoperative into the operative position and back.

According to certain preferred embodiments of the invention, the operating element is operated pneumatically and is formed by a hose which extends at least in sections along the vehicle width, which hose has at least one inflatable chamber and is made of an extensible and elastic material. Particularly the material of the matrix of the fiber composite material of the spoiler lip is used for this purpose. Such an inflatable operating element, which is evacuated in the inoperative position and can therefore be folded together, has a low space requirement and nevertheless ensures sufficient operating forces in order to be able to change the spoiler lip into the moved-out operative position. During the evacuation of the hose or of the chamber, the above-mentioned restoring forces are active which were built up in the spoiler lip itself, which spoiler lip is thereby automatically displaced from the operative position back into the moved-in inoperative position and thereby folds the hose or the chamber.

So that the hose or the chamber can be filled with a sufficiently high pressure, a fiber reinforcement for the wall of the chamber or of the hose is provided according to certain preferred embodiments of the invention.

According to certain preferred embodiments of the invention, the fiber reinforcement for the wall of the chamber or of the hose is formed by essentially inextensible fibers, as they are used for the first fiber group. The fibers extend in the wall at least partially around the chamber or the hose. The fibers limit an inflating of the chamber or of the hose in the radial direction, so that, independently of the action of pressure upon the hose or the chamber, a desired inflating cross-section of the operating element is not exceeded. Thus, in its operative position, the spoiler lip will take up the same position during each operation.

According to certain preferred embodiments of the invention, the desired bending area is constructed adjacent to the fastening section, the fibers of the first fiber group are laid into the fastening section whereby the spoiler lip can be returned in a flap-type manner from its inoperative position into the moved-out operative position and back.

Other objects, advantages and novel features of the present invention will become apparent from the following detailed description of the invention when considered in conjunction with the accompanying drawings.

BRIEF DESCRIPTION OF THE DRAWINGS

FIG. 1a is a cutout-type view of a motor vehicle with a front part and an air-conducting device, constructed according to a preferred embodiment of the present invention;

FIG. 1b is an enlarged view of a detail of the air-conducting device according to FIG. 1a;

FIG. 2a is a sectional view of a first embodiment of the air-conducting device;

FIG. 2b is an enlarged view of a detail of an operating element according to FIG. 2a; and FIG. 3 is a view of the air-conducting device according to a second embodiment.

DETAILED DESCRIPTION OF THE DRAWINGS

FIG. 1a illustrates a cutout of a motor vehicle 1, showing only a front part 4 of the vehicle body 3 carried by wheels 2. The front part 4 comprises lateral fenders 5 forming parts of the outer skin of the vehicle, a hood 6 arranged in-between, as well as a forward part 7 which is disposed in front of the hood 6 and the fenders 5 and which may represent a covering part 8 for a bumper (not shown) which can be arranged behind it. The forward part 7 therefore forms the forward end 9 of the motor vehicle 1 or of the front part 4. On the underside 10 of the front part 4, particularly on the lower section 11 (FIG. 2a) of the forward part 7 extending against the driving direction Fr, an air-conducting device 12 is arranged which forms a front spoiler 13 of the motor vehicle 1. In the area of the forward part 7, the motor vehicle 1 has a vehicle width FB which is measured between lateral longitudinal extensions 14 of the forward part, which longitudinal extensions 14 are connected by way of a base 15 of the thus U-shaped forward part 7.

By means of a strip-shaped spoiler lip 16, the air-conducting device 12 extends approximately along the vehicle width FB and, in addition,—as illustrated in FIG. 1a—may extend around into the lateral longitudinal sections 14. Irrespective of whether the spoiler lip 16 reaches into the longitudinal sections 14, the course of the spoiler lip 16 results in a contour which follows the rounded contour 17 of the base 15 of the forward part 7. As a result of its extending into the longitudinal extensions 14, rounded corner areas 18 of the spoiler lip 16 may be provided.

In FIG. 1a, the air-conducting device 12 is illustrated in a moved-out, approximately upright operative position BS, in which the spoiler lip 16 represents a downward directed extension 19 of the forward part 7, which is shown more clearly in FIGS. 2a and 3. In this operative position BS, the spoiler lip 16 acts as an aerodynamic air flow conducting element which influences the air flow in the driving operation of the motor vehicle 1 depending on the desired definitions, such as a favorable drag coefficient, optimized output forces or the like. In addition, the air-conducting device 12 can be moved from the moved-out operative position BS into a moved-in, rearward-oriented and approximately horizontal inoperative position RS, which is illustrated in FIGS. 2a and 3 by a spoiler lip 16 indicated by a broken line. In the inoperative position RS, the air-conducting device 12 has essentially no air-flow-conducting effect on the motor vehicle 1. The spoiler lip 16 is displaced from the inoperative position RS into the moved-out operative position BS by way of an operating device 20 which—viewed in the driving direction FR—is situated behind the spoiler lip 16 and will be described in detail below.

The detail of the spoiler lip 16 designated XE in FIG. 1a is illustrated in an enlarged manner in FIG. 1b. By means of its upper fastening end 21, the spoiler lip 16 is connected with the forward part 7, and its lower end forms a free end 22. The spoiler lip 16 is produced from a fiber composite material whose matrix 23 is extensible and elastic and is made particularly of a plastic material or preferably of an elastomer. Situated on the inside, a first fiber group 24 is embedded in the matrix 23 of the fiber composite material, which fiber group 24 has several approximately mutually parallel extending fibers 25 which, in addition, are aligned transversely, particularly at a right angle, with respect to the direction of the vehicle width FB or with respect to the direction of the width span BE of the spoiler lip 16. The fibers 25 of the first fiber group 24 are essentially inextensible; this means that, in the case of the forces acting upon the spoiler lip 16 in the driving operation of the motor vehicle 1, or during the movement from the inoperative position RS into the operative position BS, these fibers 25 are subjected to no change of length or only to a very insignificant change of length. As a result, the spoiler lip 16 receives a high stiffness perpendicularly to its width span BE, so that a breaking-off or excessive bending as a result of air flow pressure acting in the driving operation of the motor vehicle 1 is largely avoided. Polyester, polyamide or aramide could be used as the material for the fibers 25 of the first fiber group 24.

According to FIG. 1b, several fibers 26 of a second fiber group 27 may be embedded in the matrix 23, which extend in the direction of the width span BE of the spoiler lip 16, thus along the vehicle width FB. In the illustrated embodiment, the fibers 25 of the first fiber group 24 and the fibers 26 of the second fiber group 27 are oriented approximately at a right angle with respect to one another, and the fibers 25 extend approximately at a right angle with respect to the width span BE, or the fibers 26 extend parallel to the width span BE of the spoiler lip 16. In addition, the fibers 26 of the second fiber group 27 are made of an extensible material, particularly of a plastic material, because the spoiler lip 16 following the rounded contour of the forward part 7 is stretched during the moving-out from the inoperative position RS into the operative position BS in the direction of the width span BE, which is hindered insignificantly or not hindered by the extensible fibers 26. The extensible fibers 26 nevertheless reinforce the fiber composite material.

The fibers 25 and 26 of the first and second fiber group 24 and 27 can be embedded in the matrix 23 as a woven fabric, as a knitted fabric or the like. As an alternative, the fibers 25 and 26 may be arranged loosely with respect to one another and only fixed in their position by means of the matrix 23. Also, the fibers 25 of the first fiber group 24 can be aligned in several layers 28 and 29 (FIGS. 2a and 3) and can be aligned to extend approximately parallel to one another, the fiber composite material being produced preferably in one layer. For reasons of simplicity, the fibers 26 of the second fiber group 27 are not indicated in FIGS. 2a and 3. Otherwise, the same parts or parts having the same effect are provided with identical reference numbers in FIGS. 1a to 3.

FIGS. 2a and 3 also show that, at the free end 22 of the spoiler lip 16, a duct 30 is constructed in the spoiler lip 16 and extends at a right angle through the plane of the drawing, this duct 30 therefore extending along the width span BE of the spoiler lip 16. A bending-elastic and possibly tension-elastic element 31, such as a rod, particularly a plastic rod KS, is inserted into this duct 30. At least one roving 32 with inextensible fibers, particularly fibers 25 of the first fiber group 24, is caused to extend around the duct 30 or the bending-elastic element 31, which roving 32 is situated in the two layers 28 and 29 of the first fiber group 24. This roving 32, therefore extends from an upper fastening section 33 at the fastening end 21 of the spoiler lip 16 downward in the direction of the free end 22, is caused there to extend around the duct 30 and may extend again into the elevation-type fastening section 33. In addition, it would be conceivable to interrupt this roving 32 in at least one of the layers 28 or 29 at at least one definable desired bending point 34 so that the number of layers 28 or 29 is reduced by one layer in the desired bending point 34. In the area of the desired bending point 34, the stiffness of the spoiler lip 16 is reduced so that here an intended bending may take place. Such a desired bending point 34 may be provided adjacent to the fastening section 33 and/or at a distance thereto in order to simplify the flap-type moving from the inoperative position RS into the operative position BS of the spoiler lip 16. This desired bending point 34 may therefore form a hinge-type device.

In the embodiment illustrated in FIG. 2a, the fibers 25 of the first fiber group 24 therefore extend only to the free end 22 and to the fastening section 33 and therefore in each case end in front of it. Thus, adjacent to the fastening section 33, the desired bending point 34 is constructed in a fiber-free area 34'. Since, in the area of the free end 22, the bending-elastic element 31 can provide a sufficient stiffness of the spoiler lip 16, particularly for manufacturing reasons, the extending of the fibers 25 or of the fiber roving 32 around the duct 30 can be eliminated.

In the embodiments according to FIGS. 2a and 3, the operating element 20 for the spoiler lip 16 in each case has an inflatable and dischargeable (exhaustible) construction and, for this purpose, has at least one hose 35 which extends along the vehicle width FB or parallel to the width span BE of the spoiler lip 16 between the underside 10 and the rear side 36 of the spoiler lip 16 and, in the operative position of the spoiler lip 16—viewed in the driving direction FR—is situated behind the spoiler lip 16 and supports the latter with respect to the underside 10. The hose 35 may have one or more chambers 37, 38, 39 which—according to FIG. 3—are situated above one another and have an essentially oval or elliptical cross-section, possibly of a different cross-sectional size. As illustrated in FIG. 2a, the chambers 37 and 38 having an elliptical cross-section are fastened to one another by means of their mutually adjacent ends and, by means of their mutually spaced ends 40, 41, are fastened in the area of the free end 22 of the spoiler lip 16 or on the underside 10.

The hose 35 with its at least one chamber 37, 38, 39 is preferably made of the same material as the matrix and also comprises at least an extensible and elastic material, preferably that of the matrix 23. The wall 42 of the hose 35 or of the chambers 37 to 39 is provided with a fiber reinforcement 43 (FIG. 2b) whose fibers 44 are arranged in one or more layers LG and extend around the circumference UM of at least one of the chambers 37 to 39 or around the circumference of the hose 35 in the wall 42. The fibers 44 are essentially inextensible, whereby an excessive inflating of the corresponding chambers 37, 38 and/or 39 or of the hose in the cross-section is avoided. The fibers 44 of the fiber reinforcement 43 are assigned to the inextensible fibers 25 of the first fiber group 24 are preferably made of the same material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air-conducting device for a motor vehicle, having an operating element and a spoiler lip extending completely or partly over the vehicle width, by means of which operating element the spoiler lip can be displaced from a moved-in inoperative position into a moved-out operative position, and which spoiler lip comprises an elastic and extensible material,
   wherein the spoiler lip is made of a fiber composite material with a matrix of the fiber composite material being extensible and elastic,
   wherein a first fiber group has fibers embedded in the matrix, which fibers extend transversely to a direction of the vehicle width and thus transversely to a direction of a width span of the spoiler lip, and
   wherein the fibers of the first fiber group are essentially inextensible.

2. Air-conducting device according to claim 1, wherein a second fiber group is embedded in the matrix and has fibers which extend in the direction of the width span of the spoiler lip and are elastically extensible.

3. Air-conducting device according to claim 1, wherein the fibers of the first fiber group are embedded in the matrix as a woven or knitted fabric.

4. Air-conducting device according to claim 2, wherein the fibers of the second fiber group are embedded in the matrix as a woven or knitted fabric.

5. Air-conducting device according to claim 3, wherein the fibers of the second fiber group are embedded in the matrix as a woven or knitted fabric.

6. Air-conducting device according to claim 1, wherein the fiber composite material is constructed in one layer.

7. Air-conducting device according to claim 1, wherein at least one bending-elastic element extending along the vehicle width is arranged at a free end inside the spoiler lip.

8. Air-conducting device according to claim 5, wherein at least some of said of the first fiber group are caused to extend at least partly around the bending-elastic element.

9. Air-conducting device according to claim 1, wherein the first fiber group has several fiber layers, and
   wherein at least one fiber roving extends in two of said fiber layers.

10. Air-conducting device according to claim 6, wherein the first fiber group has several fiber layers, and
    wherein at least one fiber roving extends in two of said layers.

11. Air-conducting device according to claim 9, wherein the fiber roving is caused to extend around a bending-elastic element.

12. Air-conducting device according to claim 10, wherein the fiber roving is caused to extend around a bending-elastic element.

13. Air-conducting device according to claim 7, wherein the fibers of the first fiber group extend to the bending-elastic element.

14. Air-conducting device according to claim 1, wherein the fibers of the first fiber group have one or more fiber layers.

15. Air-conducting device according to claim 2, wherein the fibers of the second fiber group have one or more fiber layers.

16. Air-conducting device according to claim 14, wherein the fibers of the second fiber group have one or more fiber layers.

17. Air-conducting device according to claim 14, wherein the first fiber group has several fiber layers and is reduced in a desired bending area of the spoiler lip by at least one layer.

18. Air-conducting device according to claim 16, wherein the first fiber group has several fiber layers and is reduced in a desired bending area of the spoiler lip by at least one layer.

19. Air-conducting device according to claim 1, wherein the operating element for the spoiler lip is a hose which extends at least in sections along the vehicle width and has at least one inflatable chamber, and wherein the hose is made of an extensible and elastic material.

20. Air-conducting device according to claim 19, wherein a wall of the hose or of said at least one chamber is provided with a fiber reinforcement.

21. Air-conducting device according to claim 20, wherein the fiber reinforcement in the wall has essentially inextensible fibers which are caused to extend at least partly around a circumference of the chamber and are assigned to the first fiber group.

22. Air-conducting device according to claim 1, wherein the spoiler lip has a fastening section by means of which it can be connected with the motor vehicle.

23. Air-conducting device according to claim 22, wherein the fibers of the first fiber group are laid into the fastening section, and wherein a desired bending area is constructed adjacent to the fastening section.

24. Air-conducting device according to claim 22, wherein the fibers of the first fiber group end in front of the fastening section.

25. Air-conducting device according to claim 19, wherein the extensible and elastic material of the hose is that of the matrix.

* * * * *